Patented Mar. 27, 1934

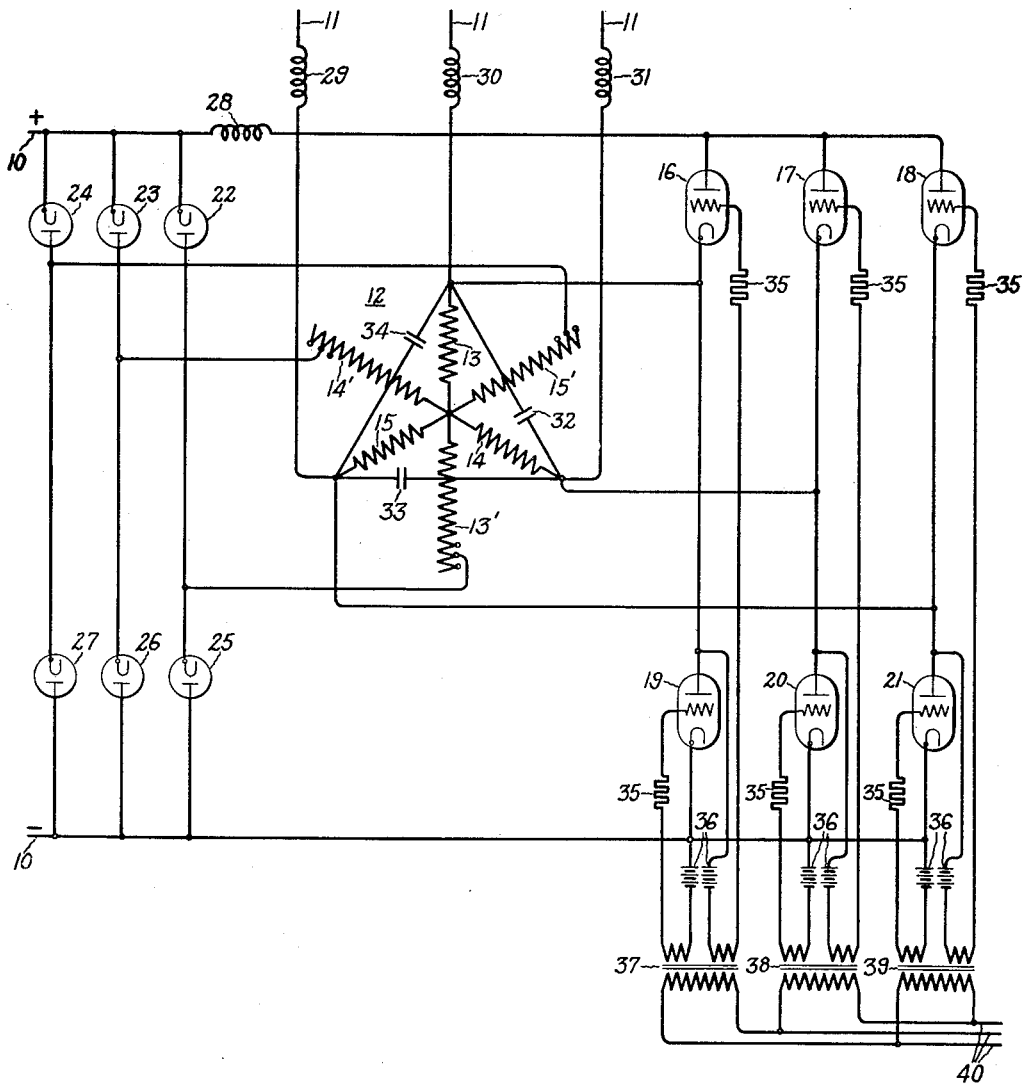

1,952,052

UNITED STATES PATENT OFFICE 1,952,052

ELECTRIC VALVE CONVERTING APPARATUS

Burnice D. Bedford, Schenectady, N. Y., assignor to General Electric Company, a corporation of New York Application November 16, 1932, Serial No. 642,926

7 Claims. (Cl. 175—363)

My invention relates to electric valve converting apparatus and more particularly to such apparatus suitable for transmitting energy from a direct current supply circuit to an independent polyphase alternating current load circuit.

In transmitting energy from a direct current supply circuit to an independent polyphase alternating current load circuit by means of electric valve converting apparatus, certain problems arise in connection with the commutation of current between the several electric valves and maintaining a proper wave form on the alternating current circuit. By an independent alternating current circuit, I refer to a circuit which is not connected to an independent source of electromotive force for determining its frequency and wave form so that the current and voltage waves on the alternating current circuit are determined by its impedance characteristics and the normal form of the wave produced by the electric valve converting apparatus. For example, in such apparatus, the use of vapor electric discharge valves has been found particularly advantageous because of the relatively large amounts of power which may be handled at ordinary operating voltages. The use of vapor electric valves, however, necessitates some special circuit apparatus for producing a commutating voltage to transfer the current between the several electric valves at the desired instants. In the arrangements of the prior art, the wave form of the voltage wave has tended to become badly distorted under certain power factor conditions, which in addition to other well known advantages, may reduce the commutating voltage at the commutating instants to an insufficient value.

It is an object of my invention, therefore, to provide an improved electric valve converting apparatus for transmitting energy from a direct current supply circuit to an independent polyphase alternating current circuit which will overcome the above mentioned disadvantages of the arrangements of the prior art and which will be simple and reliable in operation.

It is another object of my invention to provide an improved electric valve converting apparatus for transmitting energy from a direct current supply circuit to an independent polyphase alternating current load circuit including a plurality of vapor electric valves which will insure an adequate commutating voltage under all power factor conditions.

It is a further object of my invention to provide an improved electric valve converting apparatus for transmitting energy from a direct current supply circuit to an independent polyphase alternating current circuit which will supply a substantially undistorted wave form to the load circuit under all power factor conditions on the alternating current circuit.

In accordance with my invention a direct current supply circuit and an independent polyphase alternating current load circuit are interconnected through apparatus comprising a polyphase inductive network and a group of electric valves interconnecting the direct and alternating current circuits through electrically spaced terminals of the network. The electric valves are alternately rendered conductive and non-conductive in a predetermined sequence and the alternating current circuit is loaded independently through terminals displaced in phase from the terminals of the network to which the valves are connected. For example, in accordance with one embodiment of my invention, a second group of electric valves oppositely connected to the first group interconnects the phase displaced terminals with the direct current circuit to feed back energy from the alternating current circuit to the direct current circuit under predetermined conditions.

For a better understanding of my invention, together with other and further objects thereof, reference is had to the following description taken in connection with the accompanying drawing, and its scope will be pointed out in the appended claims. The single figure of the accompanying drawing illustrates an arrangement embodying my invention for transmitting energy from a direct current supply circuit to a three-phase alternating current load circuit.

Referring now more particularly to the drawing, there is illustrated an arrangement for transmitting energy from a direct current supply circuit 10 to an independent three-phase alternating current circuit 11. This apparatus includes a three-phase star-connected inductive network or transformer network 12 comprising the phase windings 13, 14 and 15, the terminals of which are connected to the positive side of the direct current circuit through electric valves 16, 17 and 18 and to the negative side of the direct current circuit through electric valves 19, 20 and 21. The valves 16-21, inc., are each provided with an anode, a cathode and a control grid and may be of any of the several types well known in the art, although I prefer to use valves of the vapor electric discharge type. The networks 13, 14, and 15 are wound on a polyphase core or are provided with a delta tertiary winding in order to maintain their voltages in polyphase relation. Each of the phase windings 13, 14, and 15 is extended beyond the neutral point of the network 12 to form the auxiliary phase windings 13', 14', and 15', respectively, while the terminals of these extended phase windings may be independently loaded through any suitable arrangement, such for example, as a rectifying arrangement for feeding energy back to the direct current circuit. The feed-back circuit comprises electric valves 22, 23, and 24, interconnecting the terminals of the phase windings 13', 14', and 15', respectively, with the positive side of the direct current circuit, and electric valves 25, 26, and 27 interconnecting these terminals with the negative side of the direct current circuit. Each of the extended windings 13', 14', and 15' may be provided with voltage changing taps, as illustrated, if desired. It may be preferable, also, to include a current smoothing reactor 28 in the direct current circuit and reactors 29, 30, and 31 in series with the alternating current circuit, to absorb certain of the harmonic voltages appearing in the wave form generated by the apparatus. While the network 12 is illustrated as an auto-transformer with the several terminals of the circuit 11 connected to its several phase terminals, it will be well understood by those skilled in the art that the network 12 may comprise the primary winding of an output transformer, the secondary winding of which may be connected to circuit 11, as is well understood by those skilled in the art.

In case electric valves 16–21, inc., are of the vapor electric discharge type, it is necessary to provide some circuit arrangement for producing a voltage to commutate the current between the several electric valves and, by way of example, I have illustrated commutating capacitors 32, 33, and 34, connected between the terminals of the phase windings, as illustrated.

In order to render the several electric valves 16–21, inc., alternately conductive and non-conductive in the proper sequence, the grids of the pairs of valves 16–19, 17–20, and 18–21 are connected to their respective cathodes through current limiting resistors 35, negative bias batteries 36 and independent secondary windings of the grid transformers 37, 38, and 39, respectively, the primary windings of which are connected to the proper phases of an alternating current circuit 40 supplied with an alternating potential of a frequency at which it is desired to energize the alternating current circuit 11. The grid transformers are preferably designed to operate self saturating in order to supply alternating potentials of peaked wave form to the grids of the several valves. In case it is not necessary to operate the circuit 11 at any predetermined frequency, the above described apparatus may be connected for self-exciting operation, as is well understood by those skilled in the art, by connecting the circuit 40 directly to the circuit 11 through any suitable phase adjusting means.

The general principles of operation of the above described apparatus when operating as an inverter, transmitting energy from the direct current circuit 10 to an alternating current circuit 11 will be well understood by those skilled in the art. In brief, if electric valves 16 and 20 are initially rendered conductive by their associated grid transformers, current will flow from the positive side of the direct current circuit through electric valve 16 and through the phase windings 13 and 14, and electric valve 20 to the other side of the direct current circuit, inducing an impulse of alternating current in the windings 13 and 14. Substantially 60 electrical degrees later, electric valve 21 will be rendered conductive and the charge accumulated on capacitor 33 during the preceding interval will be effective to transfer the current from electric valve 20 to the electric valve 21 so that current will now flow through the phase windings 13 and 15. Substantially 60 electrical degrees later, current will be commutated from the valve 16 to the valve 17 by the capacitor 32 and in this manner the current is successively transferred between the several valves of the groups 16–17–18 and 19–20–21 so that alternating current flows in each of the several phase windings 13, 14 and 15 and an alternating potential is supplied to the circuit 11.

Neglecting the extensions 13', 14' and 15' of the phase windings 13, 14 and 15, respectively, and assuming a pure resistance load on the alternating current circuit 11, the wave form of both the current and voltage waves in each of the several phase windings will comprise a positive rectangular portion of 120 electrical degrees and a negative rectangular portion of 120 electrical degrees separated by a portion of zero value for 60 electrical degrees, while the wave form of the line to line voltage and current is a stepped wave, as is well understood by those skilled in the art. With a reactive load on the alternating current circuit 11, however, the transfer of current between the several phase windings will be delayed and the voltage and current across each of the several phase windings will not be zero during the same portions of the cycle as in the case with a pure resistance load. The result is a distorted wave form in both the phase and line to line voltages and current which, in addition to well known disadvantages, may reduce the commutating potential supplied to the capacitors 32, 33, and 34 to an insufficient value. For example, under the assumed initial conditions when current is flowing through electric valve 16, phase windings 13 and 14 and electric valve 20, the greater portion of the potential of the supply circuit 10 may be consumed building up in the phase winding 13 the current which, 60 degrees previously, was transferred from the phase winding 15, so that the potential of the electrical neutral of the network 12 may fall to nearly the potential of the lower side of the direct current circuit. Under such conditions, if electric valve 21 be excited, the potential upon commutating capacitor 32, which is that between the electrical neutral of the network and the terminal of the phase winding 14, may be insufficient to commutate the current from electric valve 20 to the electric valve 21. If, however, the electrical neutral of the network is maintained substantially at a potential midway between the positive and negative sides of the direct current circuit, that is, if the potential of the direct current circuit be divided equally between the two conductive phase windings, then one terminal of the commutating capacitors will be maintained fixed at this potential and a commutating potential equal to substantially half that of the direct current circuit will always be available for commutating the current between the several electric valves.

With the use of the extended phase windings, however, if one of the phase windings, for example the winding 13, should tend to assume more than its proportion of the applied potential, an equal potential will also appear across its extended winding 13', with the result that the potential between the terminals of the phase windings 13 and 13' will be more than the applied potential. Since, under the assumed conditions, the terminal of the winding 13 is connected directly to the positive side of the direct current circuit through electric valve 15, the windings 13 and 13' through the valves 16 and 25 will act as a rectifier returning energy to the direct current circuit 10. This feed back energy acts as a circulating current through the windings of the network 12 in such relation as to redistribute the potentials across the several windings in the proper ratio. If the potentials appearing across the several phase windings 13, 14 and 15 are maintained at a proper value, obviously the potental of the electrical neutral of the network 12 will remain within predetermined limits, as will also the distortion of the wave form of the potentials appearing across the several phase windings.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. Apparatus for transmitting energy from a direct current supply circuit to an independent polyphase alternating current circuit including a polyphase inductive net work, a group of electric valves for interconnecting said direct current circuit with electrically spaced terminals of said network, means for rendering said valves alternately conductive and non-conductive in a predetermined sequence, and means for simulaneously loading said alternating current circuit from terminals displaced in phase from the terminals of said net work to which said valves are connected.

2. Apparatus for transmitting energy from a direct current supply circuit to an independent polyphase alternating current circuit including a polyphase inductive network provided with two phase displaced groups of electrically spaced terminals, a group of electric valves for interconnecting said direct current circuit with one group of said terminals, means for rendering said valves alternately conductive and non-conductive in a predetermined sequence, and means for feeding back energy from the other of said groups of terminals to said direct current circuit.

3. Apparatus for transmitting energy from a direct current supply circuit to an independent polyphase alternating current circuit including a polyphase inductive network provided with two phase displaced groups of electrically spaced terminals, a group of electric valves for interconnecting said direct current circuit with one group of said terminals, means for rendering said valves alternately conductive and non-conductive in a predetermined sequence, and a second group of electric valves for interconnecting said direct current circuit with the other of said groups of terminals and connected oppositely to said first group of valves.

4. Apparatus for transmitting energy from a direct current supply circuit to an independent polyphase alternating current circuit including a polyphase inductive network provided with two phase displaced groups of electrically spaced terminals, a group of vapor electric valves for interconnecting said direct current circuit with one group of said terminals, means for rendering said valves alternately conductive and non-conductive in a predetermined sequence, means for commutating the current between said valves, and a group of rectifying valves for interconnecting the other of said groups of termianls and said direct current circuit.

5. Apparatus for transmitting energy from a direct current supply circuit to an independent $n$-phase polyphase alternating current circuit comprising a star-connected $n$-phase inductive network, each phase winding of said network being extended on the opposite side of the neutral of the network, a group of electric valves for interconnecting said direct current circuit with the main phase windings of said network, means for rendering said valves alternately conductive and non-conductive in a predetermined sequence, and means for simultaneously loading said alternating current circuit from said extended phase windings.

6. Apparatus for transmitting energy from a direct current supply circuit to an independent three phase alternating current circuit comprising a star-connected three phase inductive network, each phase of said network being extended on the opposite side of the neutral of the network, a group of electric valves for interconnecting said direct current circuit with the main phase windings of said network, means for rendering said valves alternately conductive and non-conductive in a predetermined sequence, and a group of rectifying valves for interconnecting said extended phase windings and said direct current circuit, said extended phase windings being provided with voltage adjusting taps to determine the energy fed back by the rectifying circuit.

7. In combination, a direct current supply circuit, an independent polyphase alternating current load circuit including a polyphase inductive network, and apparatus for transmitting energy from said supply circuit to said load circuit including a group of electric valves interconnecting said direct current circuit with electrically spaced terminals of said network, means for rendering said valves alternately conductive and non-conductive in a predetermined sequence, and means for simultaneously loading said alternating current circuit from terminals displaced in phase from the terminals of said network to which said valves are connected.

BURNICE D. BEDFORD.